(12) United States Patent
Johnson et al.

(10) Patent No.: US 6,181,303 B1
(45) Date of Patent: Jan. 30, 2001

(54) FLAT PANEL THREE-DIMENSIONAL DISPLAY UNIT

(75) Inventors: John L. Johnson; James C. Kirsch, both of Huntsville, AL (US)

(73) Assignee: The United States of America as represented by the Secretary of the Army, Washington, DC (US)

(*) Notice: Under 35 U.S.C. 154(b), the term of this patent shall be extended for 0 days.

(21) Appl. No.: 09/166,642

(22) Filed: Oct. 5, 1998

(51) Int. Cl.[7] ........................................ G09G 5/00
(52) U.S. Cl. ............................................... 345/7
(58) Field of Search ............................ 345/7, 8, 9; 348/42, 348/51, 52, 54, 55, 57, 58, 744, 758, 761, 766; 349/8, 9, 11, 13, 15

(56) References Cited

U.S. PATENT DOCUMENTS

| 5,113,285 | * | 5/1992 | Franklin et al. | 359/465 |
|---|---|---|---|---|
| 5,258,833 | * | 11/1993 | Schenk | 348/51 |
| 5,537,144 | * | 7/1996 | Faris | 348/58 |
| 5,552,840 | * | 9/1996 | Ishii et al. | 348/751 |
| 5,822,117 | * | 10/1998 | Kleinberger et al. | 348/58 |
| 5,825,541 | * | 10/1998 | Imai | 348/57 |
| 5,973,831 | * | 10/1999 | Kleinberger et al. | 348/58 |
| 6,023,253 | * | 2/2000 | Taniguchi et al. | 345/7 |
| 6,064,353 | * | 5/2000 | Hoshi | 345/7 |

* cited by examiner

Primary Examiner—Richard A. Hjerpe
Assistant Examiner—Ronald Laneau
(74) Attorney, Agent, or Firm—Arthur H. Tischer; Freddie M. Bush; Hay Kyung Chang

(57) ABSTRACT

Two liquid crystal display panels, stacked together into a flat compact unit, in conjunction with a dedicated processor producing the appropriate video signals to drive the panels, generates a pair of polarization-encoded left and right images and exhibits them as a stereo image that is viewable through a pair of standard polarized glasses. This makes it possible to obtain stereo effect at a video workstation or at a console by eliminating the bulky box-like setup or the need to project onto a screen.

10 Claims, 4 Drawing Sheets

BEAMSPLITTER

PROJECTION

FLAT PANEL THREE-DIMENSIONAL DISPLAY UNIT

DEDICATORY CLAUSE

The invention described herein may be manufactured, used and licensed by or for the Government for governmental purposes without the payment to us of any royalties thereon.

BACKGROUND OF THE INVENTION

Using polarization to encode a pair of left and right images for stereo vision is not new. Prior art employed two basic methods to have both images overlap so as to result in one viewable stereo image. The methods are: (1) a projection system that projects the two orthogonally-polarized images onto a screen and (2) a beamsplitter in a large box-like enclosure with one image coming through the beamsplitter and the other image being placed on the side of the box and reflected out, as illustrated in FIG. 1. Both methods require a large space and are not compatible with use at a video workstation or at a console.

SUMMARY OF THE INVENTION

Using two liquid crystal display panels stacked together into a flat compact unit and a dedicated processor to produce the appropriate video signals to drive the panels, the flat panel three-dimensional display unit produces a pair of polarization-encoded left and right images and exhibits them as a stereo image pair that is viewable through a pair of standard polarized glasses. This eliminates the bulky box-like setup or the need to project onto a screen.

DESCRIPTION OF THE PREFERRED EMBODIMENT

Figure 1:
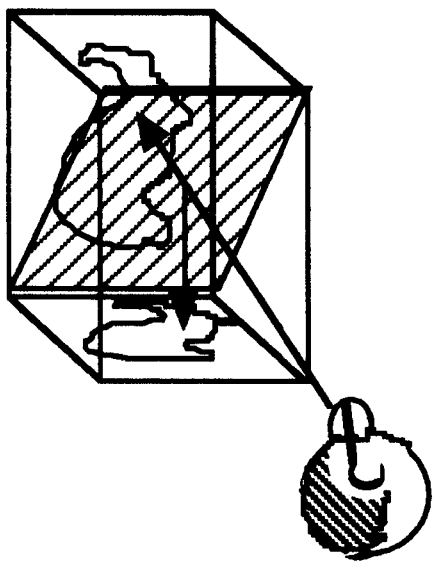
FIG. 1 illustrates some prior methods of obtaining stereo image viewing.
Figure 1:
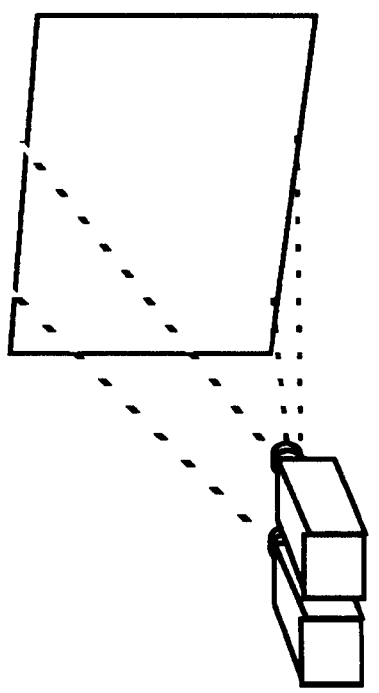
Figure 2:
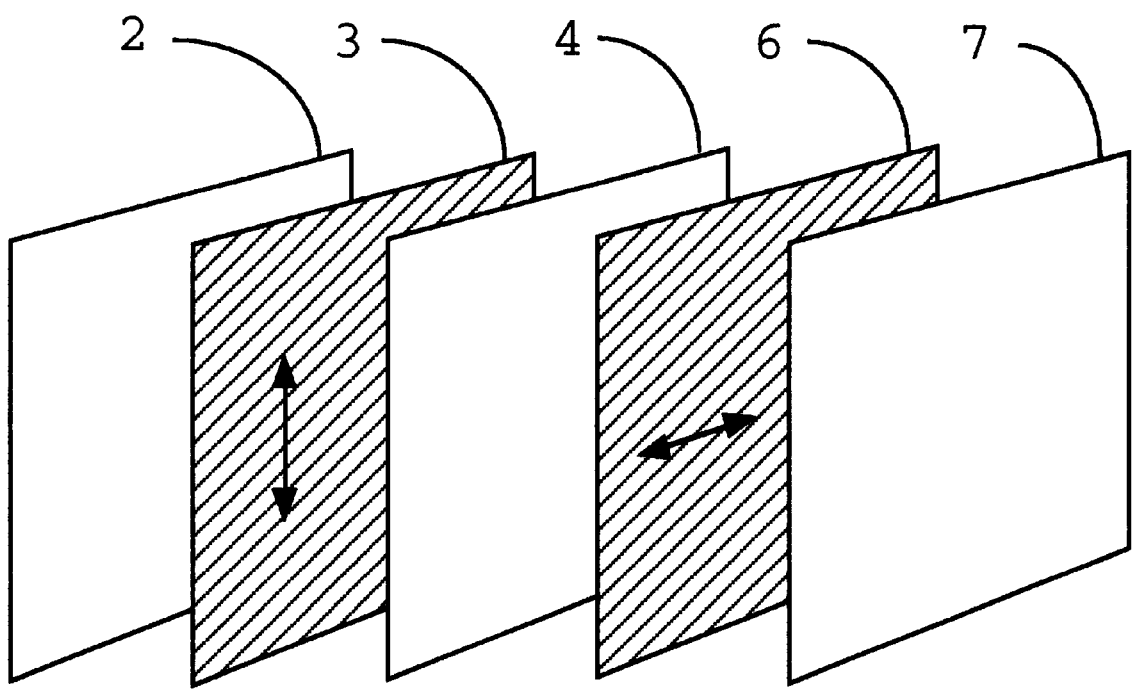
FIG. 2 is an exploded view of the two-panel compact unit.
Figure 3:
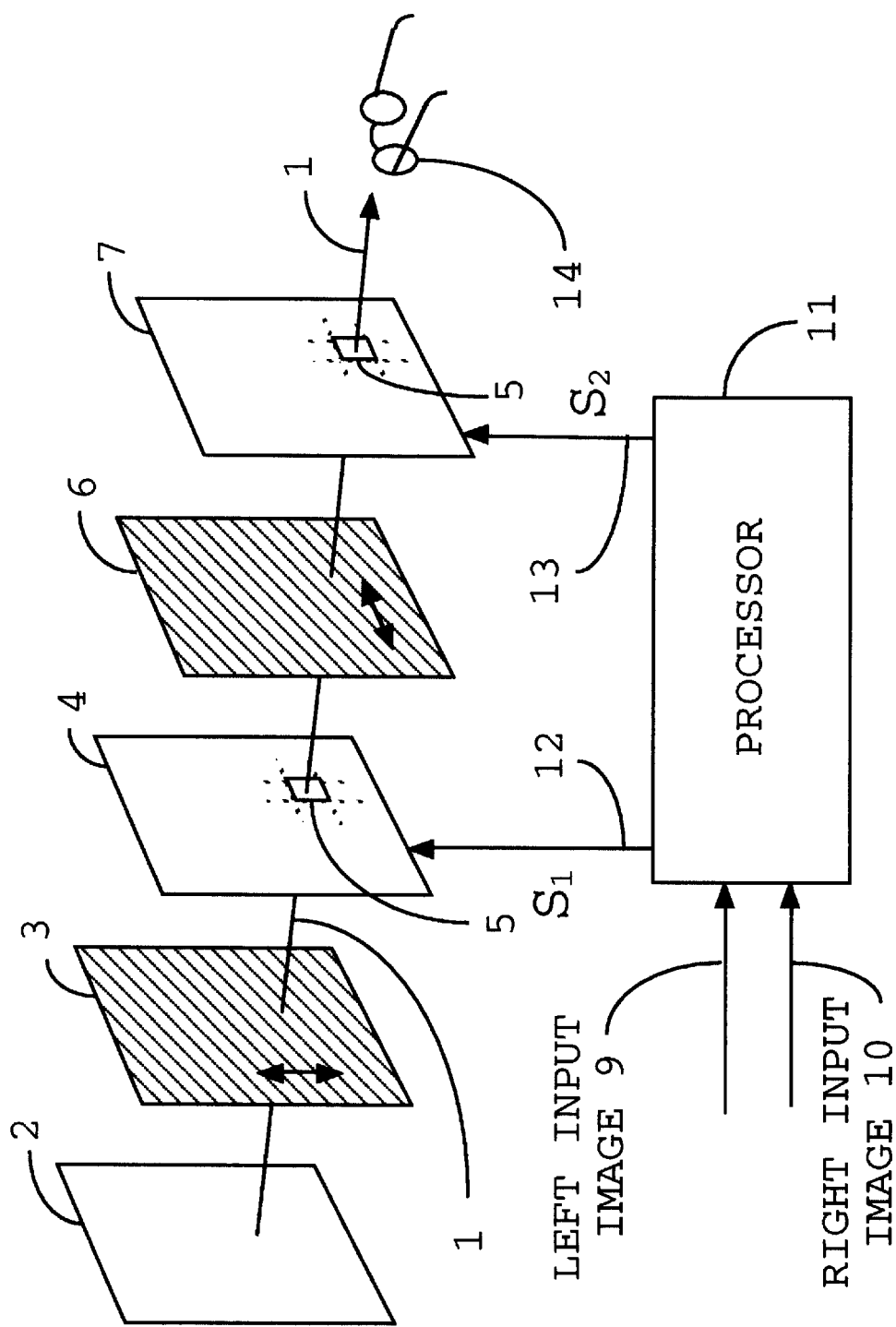
FIG. 3 depicts a preferred embodiment of flat panel three-dimensional display unit.

Referring now to the drawings wherein like numbers represent like parts in each of the several figures, FIG. 2 presents an exploded view of the two-panel compact unit. It is comprised of a standard liquid crystal panel array (complete with the sheet polarizers) of the type commonly found in laptop computers and another liquid crystal panel array but with its two sheets of polarizers removed and discarded. First polarizer 3 and first pixellated liquid crystal panel 4, together with second polarizer 6 which is orthogonally polarized from the first polarizer, comprise the standard panel while second pixellated liquid crystal panel 7 has been stripped of its two sheets polarizers. The standard panel is sandwiched between the stripped second panel and illuminator 2 to form a flat compact unit. This compact unit coupled with dedicated processor 11 via input channels 12 and 13 as shown in FIG. 3, where single-headed arrows indicate signal paths and double-headed arrows indicate the polarization orientation.

Figure 4:
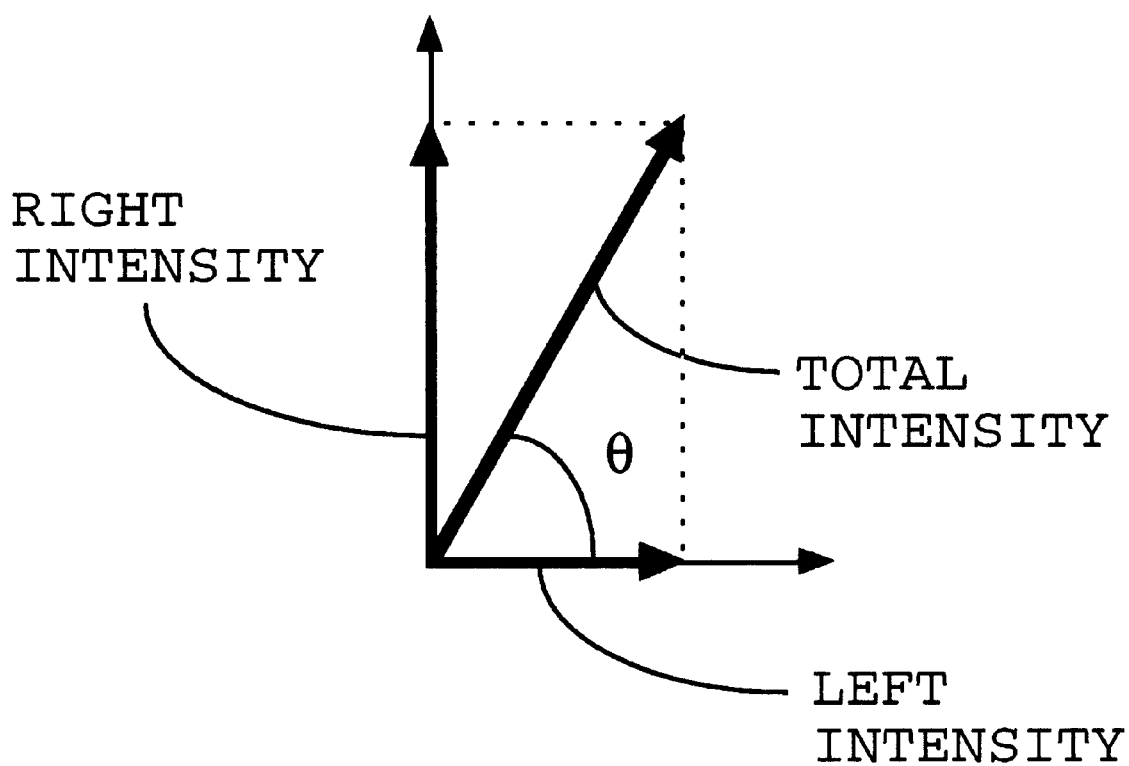
FIG. 4 shows the significance of angle $\theta$.

To produce an image whose stereo effect is obtainable with a pair of standard polarized glasses 14, left input image signal 9 and right input image signal 10, emanating from a pair of stereo cameras or generated by a computer (not shown in the figure), are input to dedicated processor 11 while illuminator 2 originates and transmits beam of light 1 through the two-panel compact unit. From the illuminator, the light passes through first polarizer 3 which gives the light a vertical linear polarization direction. Then, the vertically polarized beam passes through first liquid crystal panel 4 which, like second liquid crystal panel 7, is comprised of a plurality of identical pixels, each pixel imparting a horizontal-polarization component and a vertical-polarization component to beam 1 passing through the pixel. Meanwhile, the intensities of the left and right input image signals are recorded and processed by dedicated processor 11, the processing occurring in accordance with the following equations:

$$I_1(x,y) = I_{total}(x,y)\cos^2 \theta(x,y) = L(x,y) \quad (1)$$

$$I_2(x,y) = I_{total}(x,y)\sin^2 \theta(x,y) = R(x,y) \quad (2)$$

$$I_{total} = L + R \quad (3)$$

$$\cos^2 \theta(x,y) = L/I_{total} \quad (4)$$

where $I_1(x,y)$ is the intensity of the horizontal-polarization component of the light output, $I_2(x,y)$ is the intensity of the vertical-polarization component of the light output at each and all of the identical pixels of the panels and $I_{total}(x,y)$ is the sum of $L(x,y)$ and $R(x,y)$, $L(x,y)$ is the left input image intensity and $R(x,y)$ is the right input image intensity. Many commercially available processors can perform the above processing. One example is a Matrox framegrabber Image-1280 series. What results from above processing of input images are first and second driving video signals, $S_1$ and $S_2$, respectively. $S_1$ represents the composite sum of the intensities of the left and right input images and $S_2$ represents the intensity of the left input image divided by the composite sum. The first driving video signal, $S_1$, is coupled via first input channel 12 to first liquid crystal panel 4 where, in response to $S_1$, pixel 5 (shown greatly exaggerated for illustrative purposes) rotates the vertically polarized beam of light 1 by an amount such that when the beam subsequently passes through second polarizer 6 and is horizontally polarized thereby, the beam intensity is $I_{total} = L + R$. Second driving video signal, $S_2$, is coupled via second input channel 13 to second liquid crystal panel 7. In response to $S_2$, pixel 5 of panel 7 rotates the now-horizontally polarized beam 1 by the angle $\theta$, as given in Equation (4) and illustrated in FIG. 4. The driving video signals to the panels are often tailored to compensate for the cosine variation and other nonlinearities. The reason is that a standard NTSC signal simply gives the desired intensity for each pixel and since the liquid crystal panels are not linear signal transform devices, the signals $S_1$ and $S_2$ can be tailored by processor 11 to produce the desired effect by using a Look-Up Table (LUT). Pixel 5 referred to in above description represents each and all of the pixels in panels 4 and 7, i.e. $S_1$ is coupled to all pixels of panel 4 and $S_2$ is coupled to all pixels of panel 7. This results in pixel-by-pixel polarization of the light intensity pattern of the output image from panel 7 so that the horizontal polarization component, $I_1(x,y)$, of the output image that is imparted by each pixel corresponds to the left input image and the vertical polarization component, $I_2(x,y)$, of the output image imparted by each pixel corresponds to the right input image on a corresponding pixel-by-pixel basis. Consequently, the output light of each and every pixel of panel 7 has its own angle of polarization as well as its own composite intensity value such that when the viewer's standard polarized glasses filter the light, the left eyeglass polarizer lets through only the left image and the right eyeglass polarizer lets through only the right image, thereby enabling the viewer to see a stereo image of the left and right input images.

The flat panel three-dimensional display unit as described above can run at video frame rates and may be applied to virtual reality systems, remote operator control of unmanned vehicles, flight training displays for pilots and computer visualization systems. Some commercial applications include video games, industrial surveillance and laptop computers.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A flat panel three-dimensional display unit for displaying thereon stereo images from left and right input images, the stereo images being viewable with a pair of standard polarized glasses, said display unit comprising: a first liquid crystal panel; a second liquid crystal panel, said panels each having a plurality of identical pixels, each pixel imparting a first-polarization component and a second-polarization component to a beam passing therethrough; an illuminator for emitting and transmitting a beam of light to be incident on said panels; a first polarizer of first polarization, said first polarizer being sandwiched between said illuminator and said first liquid crystal panel; a second polarizer of second polarization, said second polarizer being positioned between said first and second liquid crystal panels, said first and second polarizers being orthogonal to each other; and a computer processor capable of processing left input images and right input images to produce therefrom a first driving video signal representing the composite sum of the intensities of the left and right input images and a second driving video signal representing the intensity of the left input image divided by said composite sum; and a plurality of channels for coupling said driving video signals from said processor to said liquid crystal panels, said driving video signals operating on said beam of light passing through said liquid crystal panels such that when said beam of light exits said second liquid crystal panel, said first-polarization component imparted by each pixel of said second panel corresponds to the left image and said second-polarization component imparted by each pixel of said second panel corresponds to the right image, thereby exhibiting stereo images that are viewable via a pair of standard polarized glasses.

2. A flat panel three-dimensional display unit as set forth in claim 1, wherein said plurality of channels comprises a first channel for coupling said first driving video signal to said first panel and a second channel for coupling said second driving video signal to said second panel.

3. A flat panel three-dimensional display unit as set forth in claim 2, wherein said processor is a Matrox framegrabber Image-1280 series.

4. A flat panel three-dimensional display unit as set forth in claim 3, wherein said first and second polarizers and said first liquid crystal panel rotate incident beam such that when the beam exits said second polarizer, the beam intensity is equal to the total of the left and right input image intensities.

5. A flat panel three-dimensional display unit as set forth in claim 4, wherein said second liquid crystal panel rotates the incident beam by a pre-selected angle θ in response to said second driving video signal.

6. A flat panel three-dimensional display unit as set forth in claim 5, wherein said three-dimensional display unit further comprises a means for compensating for the cosine variation in the horizontal polarization component of the light output at each and all of the identical pixels of said panels.

7. A flat panel three-dimensional display unit for displaying thereon stereo images from left and right input images, the stereo images being viewable with a pair of standard polarized glasses, said display unit comprising: a standard pixellated liquid crystal panel; a stripped pixellated liquid crystal panel, said stripped panel missing sheet polarizers; an illuminator positioned to illuminate said panels; and a means for generating and inputting driving video signals to said panels, said generating and inputting means comprising a computer processor capable of processing left input images and right input images to produce therefrom a first driving video signal representing the composite sum of the intensities of the left and right input images and a second driving video signal representing the intensity of the left input image divided by said composite sum and a plurality of channels for coupling said driving video signals from said processor to said liquid crystal panels so as to engender stereo images that are viewable via a pair of standard polarized glasses on said flat panel display unit.

8. A flat panel three-dimensional display unit as set forth in claim 7, wherein said plurality of channels comprises a first channel for coupling said first driving video signal to said standard panel and a second channel for coupling said second driving video signal to said stripped panel.

9. A flat panel three-dimensional display unit as set forth in claim 8, wherein said stripped liquid crystal panel rotates the incident beam by a pre-selected angle, θ, in response to said second driving video signal.

10. A flat panel three-dimensional display unit as set forth in claim 9, wherein said three-dimensional display unit further comprises a means for compensating for the cosine variation in the horizontal polarization component of the light output at each and all of the identical pixels of said panels.

* * * * *